US009680935B2

(12) United States Patent
Jiang et al.

(10) Patent No.: US 9,680,935 B2
(45) Date of Patent: Jun. 13, 2017

(54) GRID GATEWAY AND TRANSMISSION TOWER MANAGEMENT SYSTEM WITH MULTIPLE GRID GATEWAYS

(71) Applicant: National Taiwan University, Taipei (TW)

(72) Inventors: Joe-Air Jiang, Taipei (TW); Cheng-Long Chuang, Taipei (TW); Chia-Pang Chen, Taipei (TW); Chien-Hao Wang, Taipei (TW); Chih-Hao Syue, Taipei (TW); Xiang-Yao Zheng, Taipei (TW)

(73) Assignee: National Taiwan University, Taipei (TW)

( * ) Notice: Subject to any disclaimer, the term of this patent is extended or adjusted under 35 U.S.C. 154(b) by 288 days.

(21) Appl. No.: 14/527,096

(22) Filed: Oct. 29, 2014

(65) Prior Publication Data

US 2016/0014204 A1 Jan. 14, 2016

(30) Foreign Application Priority Data

Jul. 8, 2014 (TW) .............................. 103123434 A

(51) Int. Cl.
*H04L 29/08* (2006.01)
*H04W 52/02* (2009.01)
(Continued)

(52) U.S. Cl.
CPC .......... *H04L 67/12* (2013.01); *H04L 41/0853* (2013.01); *H04W 52/0216* (2013.01);
(Continued)

(58) Field of Classification Search
CPC . H04L 67/12; H04L 41/0853; H04L 49/3009; H04L 45/302; H04W 52/0216; H04W 84/18

See application file for complete search history.

(56) References Cited

U.S. PATENT DOCUMENTS

| 8,941,491 B2* | 1/2015 | Polk ........................ H04L 12/66 340/506 |
| 2009/0302994 A1* | 12/2009 | Rhee ................... H02J 13/0075 340/3.1 |

(Continued)

*Primary Examiner* — Charles C Jiang
*Assistant Examiner* — Thad Defauw
(74) *Attorney, Agent, or Firm* — Mintz Levin Cohn Ferris Glovsky and Popeo, P.C.; Peter F. Corless; Steven M. Jensen

(57) ABSTRACT

A grid gateway and a transmission tower management system having a plurality of the grid gateways are disclosed. The grid gateways are connected with one another to form a mesh network. A plurality of sensors are provided within a wireless transmission range of the grid gateways. The sensors collect and send environmental parameters to the corresponding grid gateway within the wireless transmission range, in order to choose an optimal transmission path in the mesh network through grid gateways to transmit. The environmental parameters are transmitted through the optimal transmission path to a server for storage and analysis. A grid gateway and a transmission tower management system having a plurality of the grid gateways have broad and local area wireless transmission ability, so as to overcome restrictions of topography and communication to execute broad area management and monitor tasks.

9 Claims, 3 Drawing Sheets

(51) Int. Cl.
*H04L 12/725* (2013.01)
*H04L 12/24* (2006.01)
*H04L 12/935* (2013.01)
*H04W 84/18* (2009.01)
*H04W 84/12* (2009.01)
*H04W 88/16* (2009.01)
*H04W 4/00* (2009.01)

(52) U.S. Cl.
CPC ............ *H04W 4/006* (2013.01); *H04W 84/12* (2013.01); *H04W 84/18* (2013.01); *H04W 88/16* (2013.01)

(56) References Cited

U.S. PATENT DOCUMENTS

| | | | |
|---|---|---|---|
| 2011/0053584 A1* | 3/2011 | Cook | H04M 3/02 455/419 |
| 2012/0051211 A1* | 3/2012 | Budampati | H04L 41/0659 370/217 |
| 2012/0230201 A1* | 9/2012 | Thota | H04L 67/1025 370/241 |
| 2012/0239642 A1* | 9/2012 | Bliss | G06F 17/30023 707/722 |
| 2015/0016821 A1* | 1/2015 | Li | H04B 10/25751 398/66 |
| 2015/0351336 A1* | 12/2015 | Gilbert | A01G 25/16 700/284 |

* cited by examiner

US 9,680,935 B2

GRID GATEWAY AND TRANSMISSION TOWER MANAGEMENT SYSTEM WITH MULTIPLE GRID GATEWAYS

CROSS-REFERENCES TO RELATED APPLICATIONS

This application claims under 35 U.S.C. §119(a) the benefit of Taiwanese Application No. 103123434, filed Jul. 8, 2014, the entire contents of which is incorporated herein by reference.

BACKGROUND OF THE INVENTION

1. Field of the Invention

The present invention relates to transmission tower management systems, and, more particularly, to a grid gateway and a transmission tower management system having a plurality of grid gateways.

2. Description of the Prior Art

In general, most of the extra high voltage transmission lines are aerial and provided between the electric towers within the complex and steep terrain. Thus, the voltage transmission lines will be widespread and distributed over a wide area to overcome the rough and irregular topography.

During the transmission, the voltage transmission lines will pass the urban, mountain, coastal areas, and so on. However, the different natural disasters in the various areas will result in the damage of transmission lines accidentally. For example, in the coastal areas, the climate of high moist and salinity may make the transmission lines age more easily. In addition, in the mountain areas, the mudslides may make the depletion of the soil near the power tower by the earthquake and heavy rain, and that will make the ground slide and make the buildings tilt or even collapse. Once the accidents mentioned above happen, except tbr the impact of the people's daily life, the industrial loss cased by powerless will be inestimable.

To increase the safety of transmission lines and transmission tower, build is systemic management and monitoring mechanism is necessary. However, the power towers are mainly built in the urban, mountain, and costal areas, these areas don't have as enough infrastructures of interact communication as metro areas has. In addition, the distance between the tower to tower is usually too long and doesn't has any wireless network. Thus, the monitoring data can not be efficiently transmitted back to the remote monitoring center through a single network system. That makes a big restriction of the data communication and transmission.

According to the above information, there is an urgent need in building a transmission management and monitoring mechanism which can overcome the restriction of the data communication and transmission, so the monitoring data can be collected and be analyzed more efficiently, and even can further be taken as the reference for maintenance and management.

SUMMARY OF THE INVENTION

In light of the foregoing drawbacks of the prior art, the present invention provides a grid gateway and a transmission tower management system having a plurality of grid gateways to build a management and monitoring system to overcome the restrictions of topography and communication.

The present invention provides a transmission tower system, comprising: a plurality of sensors provided on extra high voltage transmission lines of transmission towers to collect environment parameters around the extra high voltage transmission lines; a plurality of grid gateways provided on the transmission towers to receive the environment parameters from the sensors within a wireless transmission range of the grid gateways, the grid gateways being connected to one another to form a mesh network, and the environment parameters being transmitted to one of the grid gateways through the mesh network; and a server connected to at least one of the grid gateways to receive the environment parameters and save the environment parameters in a database of the server.

The present vention further provides a grid gateway, comprising: a LAN wireless module that receives environment parameters collected by sensors disposed on extra high voltage transmission lines of transmission towers; a WAN wireless module connected to a WAN wireless module provided on grid gateways of another transmission tower to form a mesh network; a packet format converting module connected to the LAN wireless module to acquire the environment parameters and convert the environment parameters from a LAN packet format of the LAN wireless module to a WAN packet format of the WAN wireless module; and a router module that chooses an optimal transmission route within the mesh network, wherein the WAN wireless module transmits the environment parameters in the WAN packet format through the optimal transmission route to one of the grid gateways within the mesh network.

Accordingly, the grid gateway and the transmission tower management system comprising a plurality of grid gateways according to the present invention are capable for wireless transmission in wide and local areas. Thus, the present invention can overcome the restrictions of the topography and communication. The environment parameters can be transmitted to the back-end management center efficiently. Then, the operation state of the transmission towers and the grid gateway network can be managed and monitored simultaneously and ensure the safety of the transmission towers and the grid gateway network.

DETAILED DESCRIPTION OF THE PREFERRED EMBODIMENTS

The present invention is described in the following with specific embodiments, so that one skilled in the pertinent art can easily understand other advantages and effects of the present invention from the disclosure of the present invention and be utilized or applied according to the other different embodiments.

Figure 1A:
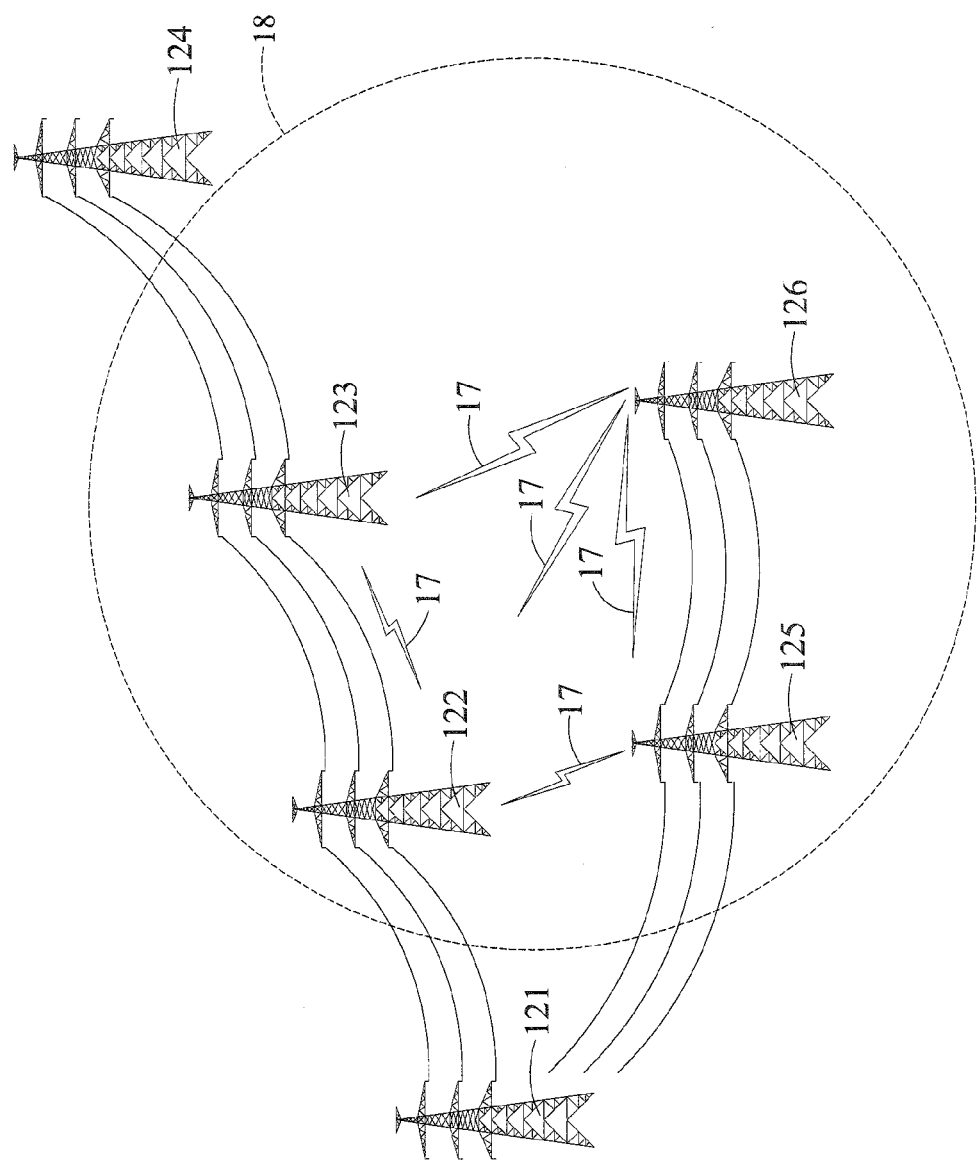
FIG. 1A is a schematic view of a transmission tower management system having a plurality of grid gateways according to the present invention.
Figure 1B:
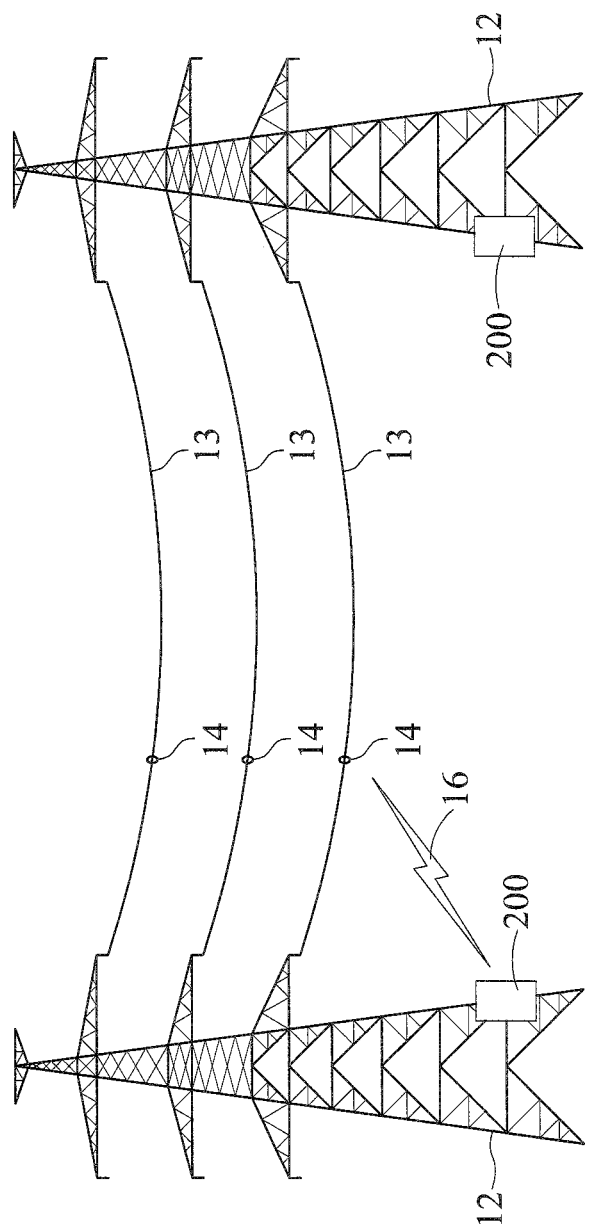
FIG. 1B is a schematic view illustrating the connection condition between any two of the transmission towers in accordance with FIG. 1A.
Figure 2:
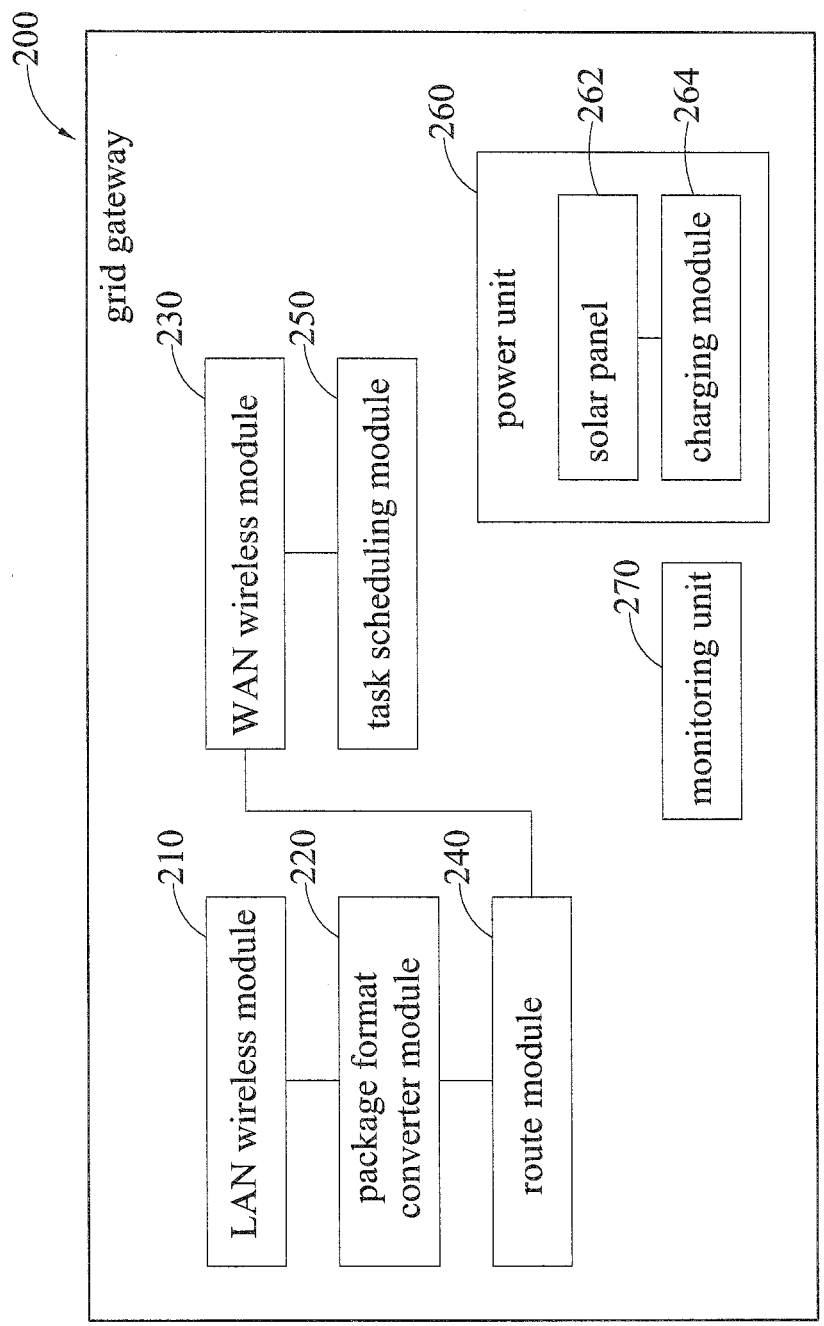
FIG. 2 is a schematic view of a grid gateway according to the present invention.

FIG. 1A is a schematic view of a transmission tower management system having a plurality of grid gateways according to the present invention. FIG. 1B is a schematic view illustrating the connection condition between any two of the transmission towers in accordance with FIG. 1A. FIG. 2 is a schematic view of a grid gateway 200 according to the present invention. In an embodiment, the grid gateway 200 is provided directly on a transmission tower 12 or in the industrial distribution box on the transmission tower 12. The industrial distribution box can prevent the damage caused by long term exposure. The grid gateway 200 comprises a local area network (LAN) wireless module 210, a wide area network (WAN) wireless module 230, a packet format converting module 220, and a router module 240. The LAN wireless module 210 is used to connect a plurality of sensors 14 on extra high voltage transmission lines 13 provided on the transmission tower 12. The connection is built by a wireless method. In an embodiment, the connection between the LAN wireless module 210 and the sensors 14 build the first (e.g., ZigBee) wireless connection 16 in the wireless sensing network protocol (e.g., ZigBee). In other words, the LAN wireless module 210 is specifically the ZigBee wireless sensor network (802.15.4 WPAN) transmission module. The plurality of sensors 14 carry the same ZigBee wireless sensing network transmission module to build the first wireless connection 16 with the LAN wireless module 210. In addition, the plurality of sensors 14 are provided with a variety of sensing components, such as a temperature sensor, a humidity sensor, a rain gauge, an anemometer, an illuminometer, a 3-axis accelerometer, and so on. With the plurality of sensing components, the environment parameters, such as temperature, temperature of the extra high voltage transmission lines, humidity, rainfall, illuminance, gravity acceleration, and so on, can be acquired. The environment parameters can then be transmitted to the grid gateways 200 through the first wireless connection 16.

The WAN wireless module 230 of the grid gateway 200 has a different wireless network protocol from the LAN wireless module 210. Specifically, the WAN wireless module 230 uses IEEE 802.11 protocol. The specification of the protocol can be used to make a base station connect to a polarity of subscriber stations with each other and build a many-many mesh network. In other words, since the grid gateway 200 provided on the transmission tower 12 has the WAN wireless module 230, the transmission towers can build the mesh network which has the second (e.g., IEEE 802.11) wireless connection 17 via the WAN wireless module 230 of the respective grid gateways 200. It means that each grid gateway is applied as a base station and subscriber station simultaneously. In an embodiment, as shown in FIG. 1A, the mesh network is mainly built with the transmission towers 126. The transmission range of the mesh network is the wireless transmission range of the grid gateways 18 of the transmission towers 126. Within the wireless transmission range of the grid gateways 18, the transmission towers 122, 123 and 125 can build the second connection 17 with the transmission tower 126 respectively. The transmission towers 121 and 124 are outside the wireless transmission range of the grid gateways 18, so the connection to the transmission tower 126 cannot be built. However, the transmission towers 121 and 124 can build the connection with other transmission towers inside the transmission range. Therefore, the grid gateways of each transmission tower can build connection to the other transmission towers inside the wireless transmission range and form a large mesh network accordingly. In an embodiment, the WAN wireless module is specifically an industrial router with WiFi function, and the transmission distance can reach to 2 kilometer. Thus, if there is a server 11 inside the wireless transmission range of the grid gateways 200, the grid gateway 200 then can build the second connection 17 to the server 1. The data can further be transmitted to the server 11 and save in the database of server 11.

The packet format converting module 220 is connected to the LAN wireless module 210 for acquiring the environment parameters. In an embodiment, the packet format converting module 220 is a software program. The packet format converting module 220, after receiving the environment parameters, converts the environment parameters from the LAN packet format of the LAN package wireless module 210 to the WAN packet format of the WAN wireless module 230. For example, the packet format of environment parameters will be converted from ZigBee protocol to IEEE 802.11 protocol.

After received by the sensors 14 of the grid gateways 200, the environment parameters will be transmitted to the server 11. When the grid gateway 200 receives and transmits the environment parameters to the server 11, the router module 240 will firstly choose an optimal route within the mesh network by an algorithm, and the WAN wireless module 230 transmits the environment parameters in the packet format of IEEE 802.11 protocol through the optimal route to one of the grid gateways 200 within the mesh network. In an embodiment, the environment parameters will be transmitted to the nearest one of the grid gateways to the server 11, as the transmission tower shown in FIG. 1A. As the nearest one of the grid gateways 200 is chosen, the software program, or the router module 240 will determine the optimal transmission route according to the quality of service (QoS), the time to live (TTL), or the priority of traffic between the grid gateways within the mesh network. For example, to choose the route of the better QoS, short TTL, or use the enhanced distributed channel access (EDCA) based on competition, HCF controlled channel access (HCCA) based on non-competition, an so on techniques to control the each traffic has different priority or the bandwidth resource and so on, and choose the optimal route accordingly.

The grid gateway 200 further includes a power unit 260 for supplying the electric power to the grid gateway 200. For the electric power to be supplied stably, the power unit 260 includes a solar panel 262 and a charging module 264. The solar panel 262 can convert the solar light to electric power and stores the electric power in the charging module 264 such that the electric power can be supplied to the grid gateway 200 at any time. In an embodiment, the charging module 264 is a secondary battery.

Furthermore, a grid gateway 200 further includes at least one monitoring unit 270 to collect the environment parameters around the arid gateway 200, including temperature, temperature of extra high voltage transmission lines, humidity, rainfall, illuminance, gravity acceleration, and so on. As such, the grid gateway 200 can be provided with a plurality of different monitoring unit 270 to acquire different environment parameters for different propose. For example, 3-axis accelerometer, temperature sensor, humidity sensor, rain gauge, anemometer, and so on can be provided.

As such, the grid gateway 200 further includes a task scheduling module 250. In an embodiment, the task scheduling module 250 is a software program, which can be used to set the grid gateway 200 to execute the command from the software on schedule time and can repeatedly execute the command periodically. In an embodiment, the WAN wireless module 230 within the grid gateway 200 can be set to turn on at 10:00 a.m. everyday, and to turn off at 10:10 a.m. everyday. In other words, the WAN wireless module 230 only works 10 minutes everyday, and the transmission of environment parameters will be complete in the 10 minutes routinely. Thus, because the WAN wireless module 230 is kept in a turning-off state for a long time to reduce the connection state time, the power can be saved.

In another embodiment, as shown in FIGS. 1A and 1B, the grid gateway 200 can build a transmission tower, which includes a plurality of sensors 14, a plurality of grid gateways 200, and a server 11. The plurality of sensors 14 are provided on the extra high voltage transmission lines 13 between the plurality of transmission towers 12. In an embodiment, sensors 14 are temperature sensors, humidity sensors, rain gauges, anemometers, illuminometer, or 3-axis accelerometers. Therefore, the environment parameters around the extra high voltage transmission lines 13 can be acquired, for example, temperature, temperature of extra high voltage transmission lines 13, humidity, rainfall, wind direction, wind speed, illuminance, gravity acceleration, and so on. In addition, the grid gateways 200 are provided on a plurality of transmission towers, and have to be disposed within the corresponding wireless transmission range. Thus, the grid gateways 200 can then build a first connection 16 in ZigBee protocol to the sensors 14 within the wireless transmission range to receive the environment parameters which are collected by sensors 14. As the mesh network is formed by the connection between grid gateways to each other via IEEE 802.11 protocol. In other words, the grid gateways 200 communicates with one another through the second connection 17, and at least one of grid gateways 200 can connect to the server 11 through the second connection 17. Accordingly, the environment parameters acquired by the sensors 14 can be transmitted to the grid gateways 200 through a first connection 16, and transmitted to any one of the plurality of grid gateways 200 within the mesh network formed by a plurality of grid gateways 200. The environment parameters can finally be transmitted from a grid gateway 200 to a server 11 for saving the parameters through the second connection 17 which is built by grid gateways and a server 11. Besides, the clock of a plurality of grid gateways can be synchronized to make the data, for example, environment parameters can be transmitted opportunely and not get lost easily.

As a summary of the above description, the grid gateway and the transmission tower which is provided with a plurality of grid gateway in the present invention can transmit the received environment parameters back to the remote server for saving and analyzing, so the manager will not need to be in the frontline to know the operation state of the grid instantly. As under the structure of the mesh network between each grid gateways, the connection of the whole network is highly fault tolerance. When one of the grid gateways is malfunctioned, the environment parameters can still be transmitted via other arid gateways. As such, the transmission tower management system in the present invention has stable transmission channels and faster transmission speed. In addition, the structure of the mesh network can overcome restrictions of the topography and the communication caused by the location of the transmission towers, and it can also improve the work efficiency of wide area management and task monitoring to ensure the safety operation of the power supply network. Beside, the design of task scheduling to turn on and turn off the WAN wireless module synchronously can make the propose of power saving be achieved more efficiently.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A transmission tower management system, comprising:
   a plurality of sensors provided on extra high voltage transmission lines of transmission towers to collect environment parameters around the extra high voltage transmission lines;
   a plurality of grid gateways provided on the transmission towers to receive the environment parameters from the sensors within a wireless transmission range of the grid gateways, wherein the grid gateways are connected to one another to form a mesh network, and the environment parameters are transmitted to one of the grid gateways through the mesh network; and
   a server connected to at least one of the grid gateways to receive the environment parameters and save the environment parameters in a database of the server,
   wherein the grid gateways comprise:
      a local area network (LAN) wireless module that receives the environment parameters around the extra high voltage transmission lines of the transmission tower that are collected by the sensors;
      a wide area network (WAN) wireless module connected to a WAN wireless module provided on a grid gateway of another transmission tower to form the mesh network;
      a packet format converting module connected with the LAN wireless module to acquire the environment parameters and convert the environment parameters from a LAN packet format of the LAN wireless module to a WAN packet format of the WAN wireless module; and
      a router module that chooses an optimal transmission route within the mesh network,
      wherein the WAN wireless module transmits the environment parameters in the WAN packet format through the optimal transmission route to the one of the grid gateways within the mesh network, and
      wherein the router module chooses the optimal transmission route in accordance with quality of service (QoS), time to live (TTL), or priority of traffic between the grid gateways within the mesh network.

2. The transmission tower management system of claim 1, wherein the grid gateways and the sensors are connected via ZigBee protocol, and the grid gateways are connected to one another via IEEE 802.11 protocol to form the mesh network.

3. A grid gateway, comprising:
   a LAN wireless module that receives environment parameters collected by sensors disposed on extra high voltage transmission lines of transmission towers;
   a WAN wireless module connected to a WAN wireless module provided on grid gateways of another transmission tower to form a mesh network;
   a packet format converting module connected to the LAN wireless module to acquire the environment parameters and convert the environment parameters from a LAN packet format of the LAN wireless module to a WAN packet format of the WAN wireless module; and
   a router module that chooses an optimal transmission route within the mesh network,
   wherein the WAN wireless module transmits the environment parameters in the WAN packet format through the optimal transmission route to one of the grid gateways within the mesh network, and
   wherein the router module chooses the optimal transmission route in accordance with quality of service (QoS), time to live (TTL), or priority of traffic between the grid gateways within the mesh network.

4. The grid gateway of claim 3, wherein the WAN wireless module sends the environment parameters in the WAN packet format to a server, and saves the environment parameters in a database of the server.

5. The grid gateway of claim 3, wherein the WAN wireless module is an industrial router that has a WiFi function.

6. The grid gateway of claim 3, wherein the LAN wireless module uses ZigBee protocol, and the WAN wireless module uses IEEE 802.11 protocol.

7. The grid gateway of claim 3, further comprising a monitoring unit that acquires the environment parameters around the grid gateways, wherein the monitoring unit is a 3-axis accelerometer, a temperature sensor, a humidity sensor, a rain gauge, or an anemometer.

8. The grid gateway of claim 3, further comprising a task scheduling module that sets and executes tasks of turning on/off the WAN wireless module at predetermined time periodically.

9. The grid gateway of claim 3, further comprising a power unit that comprises a solar panel and a charging module, wherein the charging module stores electric power generated from the solar panel, and the power unit supplies the electric power to the gird gateway.

* * * * *